United States Patent

[11] 3,617,964

[72] Inventor Ronald W. Bocksruker
 Los Angeles, Calif.
[21] Appl. No. 34,459
[22] Filed May 4, 1970
[45] Patented Nov. 2, 1971
[73] Assignee TRW Inc.
 Redondo Beach, Calif.

[54] LINEAR DISPLACEMENT AMPLIFICATION DEVICE AND DEFLECTION TRANSDUCER EMBODYING SAME
 5 Claims, 4 Drawing Figs.
[52] U.S. Cl..................................................... 336/30,
 74/99, 336/130
[51] Int. Cl..................................................... H01f 21/02
[50] Field of Search........................................... 336/30,
 132, 133, 134; 74/99

[56] References Cited
 UNITED STATES PATENTS
 2,709,790 5/1955 Swanson...................... 336/30
 3,153,210 10/1964 Kinderman.................. 336/30
 3,233,231 2/1966 Anderson..................... 336/30 X Primary Examiner—Thomas J. Kozma
Attorneys—Daniel T. Anderson, Donald R. Nyhagen and Jerry A. Dinardo ABSTRACT: A linear displacement amplification device having fulcrum means rockably engaging opposite sides of a lever in a common plane normal to the longitudinal axis of the lever and restrained against sliding movement along the lever, and means supporting one fulcrum, means for movement lengthwise of the lever relative to the other fulcrum means in response to a linear input displacement. This relative movement of the fulcrum means causes lateral displacement of one end of the lever proportional to but substantially greater than the input displacement. A deflection transducer embodying the linear displacement amplification device for producing an electrical output representing the amplified input displacement.

PATENTED NOV 2 1971
3,617,964
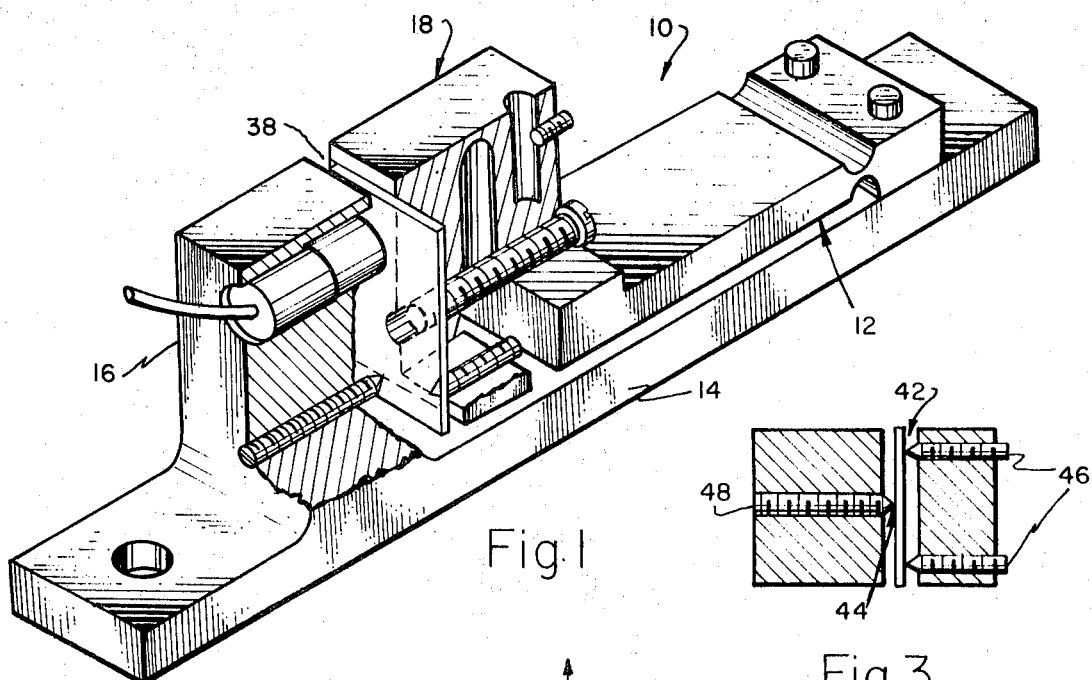
Fig. 1
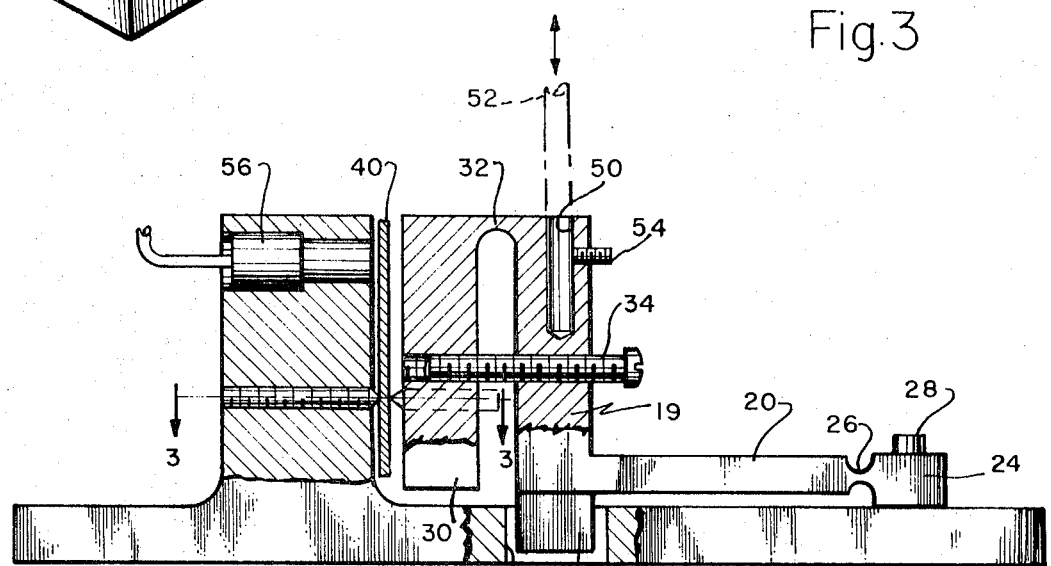
Fig. 3
Fig. 2
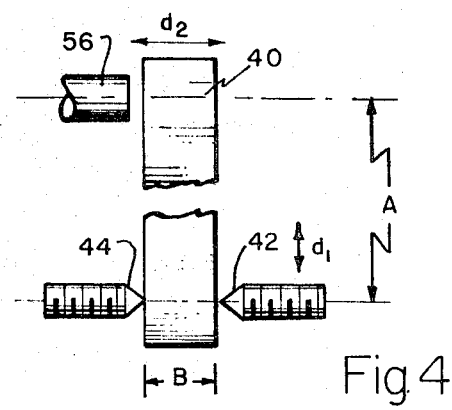
Fig. 4
Ronald W. Bocksruker
*INVENTOR*
BY
*Donald R. Nyhagen*
ATTORNEY

LINEAR DISPLACEMENT AMPLIFICATION DEVICE AND DEFLECTION TRANSDUCER EMBODYING SAME

BACKGROUND OF THE INVENTION

1. Field of the Invention

This invention relates generally to the art of sensing and measuring mechanical displacements. The invention relates more particularly to a linear displacement amplification device and to a deflection transducer embodying the amplification device.

2. Prior Art

One important aspect of the invention is concerned with a deflection transducer of the class which converts a linear mechanical motion or displacement into an electrical output representing the displacement. A wide variety of such deflection transducers have been devised. Generally speaking, these deflection transducers are characterized by a movable element which is operatively coupled to the input member whose linear displacement is to be monitored. A given linear input displacement of the input member effects output displacement of the movable transducer element through a distance proportional to the input displacement. A sensor is provided for producing an electrical output representing the output displacement for the transducer element.

In some deflection transducers, the movable transducer element is directly coupled to the input member, so that a 1 to 1 ratio exists between the input displacement of the input member and the output displacement of the transducer element. In other deflection transducers, the movable transducer element is coupled to the input member through a displacement amplification device which amplifies the input displacement into a substantially greater output displacement. The present invention provides an improved displacement amplifying linear deflection transducer of the latter kind.

The existing linear deflection transducers commonly employ an output displacement sensor which is directly coupled to the output element of the transducer. This type of transducer suffers from the disadvantages of relatively high hysteresis, backlash, and friction. The present commercial availability of well-stabilized, high output proximity sensors has now paved the way for a new regime of high resolution deflection transducers. These proximity sensors, some with outputs as high as 400 millivolts per thousandth of an inch displacement, operate on a principle involving the induction of eddy currents in the movable transducer element whose displacement is being sensed to unbalance a finely tuned inductive-capacitive bridge circuit. The low mechanical energy input requirements of such a system, along with the noncontacting features of the proximity sensor, permit the detection of extremely small displacements without the usual hysteresis and backlash difficulties of the conventional directly coupled deflection sensors.

SUMMARY OF THE INVENTION

According to one of its important aspects, the invention provides a linear displacement amplification device for converting a given linear input displacement into a substantially amplified output displacement. This amplification device has a pair of fulcrum means rockably engaging opposite sides of a lever in a common plane normal to the longitudinal axis of the lever. Each fulcrum means is restrained against sliding movement along the lever, such that the position of each fulcrum means relative to the lever is fixed. One fulcrum means is supported for relative movement lengthwise of the lever with respect to the other fulcrum means in response to an input displacement being monitored. Movement of the movable fulcrum means in response to the input displacement causes lateral displacement, herein referred to as an output displacement, of one end of the lever. This output displacement is proportional to, but substantially greater than the input displacement.

Another aspect of the invention is concerned with a deflection transducer embodying the linear displacement amplification device. This transducer is equipped with a sensor for producing an electrical output representing the amplified output displacement of the transducer lever.

The particular embodiment of the deflection transducer selected for presentation in this disclosure utilizes a proximity sensor for detecting the amplified output displacement of the transducer lever. The transducer fulcrum means comprise conical fulcrum points on hardened setscrews which rockably seat within conical recesses in the lever surfaces. One fulcrum means is fixed to a supporting base, and the other fulcrum base is supported on the base for movement, lengthwise of the lever, relative to the fixed fulcrum means. The movable fulcrum means has coupling for connection to an input member whose input displacement is to be monitored, in a manner such that the input displacement occurs in the direction of movement of the movable fulcrum means. The proximity sensor is supported on the transducer base adjacent to the free or output end of the transducer lever so as to produce an electrical output representing the amplified output displacement of the lever.

BRIEF DESCRIPTION OF THE DRAWINGS

In the drawings:

FIG. 1 is a perspective view, partially in section, of a present linear deflection transducer;

FIG. 2 is a side elevation of the transducer with parts sectioned;

FIG. 3 is a section taken on line 3-3 in FIG. 2; and

FIG. 4 is a diagrammatic illustration of the displacement amplifying lever system of the transducer.

DESCRIPTION OF THE PREFERRED EMBODIMENTS

The drawings illustrate a linear deflection transducer 10 according to the invention embodying a present linear displacement amplification device 12. Transducer 10 has a base 14 mounting an upstanding blocklike support 16 rigid on the base. Base 14 also mounts a movable support 18 of generally inverted U-shape having one depending leg 19 fixed to the free end of a beam 20. The opposite end of the beam is machined to form a mounting block 24 and a flexural pivot 26 between the mounting block and the beam proper. Mounting block 24 is attached by bolts 28 to the base 14. The movable support 18 is thus supported by the beam 20 for vertical movement relative to the fixed support 16.

Movable support 18 has a depending free leg 30 pivotally attached at its upper end to the upper end of fixed support leg 19 by a flexural pivot 32. Free support leg 30 is thus flexible toward and away from the fixed support leg 19. A bolt 34 joins the support legs 19, 30 for adjusting the free leg toward and away from the fixed leg. A depending tongue 35 on the underside of the beam 20 fits within a slot 36 in the base 14 to facilitate assembly The confronting faces of the fixed support 16 and the free leg 30 of movable support 18 are spaced to define a narrow intervening gap 38. Positioned within this gap is a lever 40. Lever 40 is rockably supported by fulcrum means 42, 44 on the fixed support 16 and the free arm 30 of the movable support 18. Fulcrum means 42, 44 rockably engage opposite sides of the lever 40 in a common plane normal to the longitudinal axis of the lever and generally parallel to the base 14. Each fulcrum means is restrained against sliding movement along the lever. The illustrated fulcrum means 42 comprise conical points on a pair of hardened setscrews 46 which are threaded in the movable support leg 30. Fulcrum means 44 comprises conical point on a hardened setscrew 48 which is threaded in the fixed support 16. The pointed fulcrums 42, 44 of the fulcrum screws 46, 48 seat within conical recesses in the adjacent surfaces of lever 40. According to the preferred practice of the invention, lever 40 is constructed of a softer metal than the fulcrum screws 46, 48, and the fulcrum recesses are formed in the lever by forcing the pointed fulcrums 42, 44 into the lever surfaces to indent these surfaces.

The fulcrums 42 engage the lever 40 adjacent its vertical edges. The fulcrum 44 engages the lever along its longitudinal centerline, midway between the fulcrums 42.

Entering the upper surface of the movable support 18 is a socket 50 for receiving a linearly movable input member 52. A setscrew 54 is provided for securing the input member to the movable support. Referring particularly to FIG. 2, it will be seen that linear movement of the input member 52 in the direction of the arrows effects substantially vertical movement of the movable support 18 relative to the fixed support 16 with the resultant deflection of the beam 20 about its flexural pivot 26. Vertical movement of the movable support relative to the fixed support, in turn, causes vertical movement of the movable fulcrums 42 relative to the fixed fulcrum 44. It is evident from FIG. 2 that this vertical movement of fulcrums 42 causes rocking of the lever 40 on the fixed fulcrum 44 and resultant lateral displacement of the upper end of the lever. As explained below, a given input displacement of the input member 52 produces proportional but substantially larger output displacement of the upper end of the lever 40. Thus, the linear displacement amplification device 12 is effective to translate a given input displacement into a substantially larger output displacement of the lever.

The linear deflection transducer 10 is equipped with a sensor 56 for producing an electrical output representing the position of the upper end of the lever 40 relative to the sensor and hence the output displacement of the lever. In the particular transducer shown, the sensor 56 is a proximity sensor of the kind mentioned earlier whose operation involves the induction of eddy currents within the lever 40 to unbalance a finely tuned inductive-capacitive bridge circuit (not shown) connected to the transducer. It will now be understood that the deflection transducer 10 is operative to amplify the input displacement of the input member 52 and to produce an electrical output proportional to the amplified input displacement.

Regarding the displacement amplifying action of the amplifier 12, it is evident from FIG. 4 that the fulcrums 42, 44 and the lever 40 effectively constitute a first-class lever system, wherein the dimension A, measured between the common plane of the fulcrums and the center line of the sensor 56 represents the longer arm of the lever and the dimension B, measured between the point of fulcrum 44 and a line joining the points of fulcrums 42, represents the shorter arm of the lever. A given displacement $d_1$ of the movable fulcrum 42 produces a lateral displacement $d_2$ of the lever 40 which is greater than the fulcrum displacement $d^1$ by the lever arm ratio A/B. Coarse adjustment of the gain of the amplifier 12 may be accomplished by varying the effective thickness of the lever 40 so as to change the lever arm dimension B in FIG. 4. Fine adjustment of the amplifier gain may be accomplished by varying the engagement force of the fulcrum points 42, 44 against the lever, such as to cause the lever to deflect laterally or to yield locally about any or all of the fulcrum points and thereby vary the lever dimension B. In this regard, it is significant to note that it is the distance from the fulcrum point 44 to the line joining the two fulcrum points 42 that determines the shorter lever arm length B in FIG. 4, regardless of lateral deflection of the lever or local yielding about any or all of the fulcrum points.

I claim:

1. A linear deflection transducer comprising:

a lever;

first and second fulcrum means rockably engaging opposite sides of said lever in a common plane normal to the longitudinal axis of said lever;

means restraining each fulcrum means against sliding movement along said lever;

means supporting said fulcrum means for relative movement in the endwise direction of said lever to cause lateral displacement of one end of said lever; and means for sensing displacement of said one end of said lever.

0. A transducer according to claim 1 wherein:

said restraining means comprise recesses in the surfaces of said lever rockably seating said fulcrum means.

3. A transducer according to claim 2 wherein:

said lever is relatively soft; and said fulcrum means are relatively hard and have fulcrum points rockably engaging said lever and adapted to be forced into the lever surfaces to form said recesses.

4. A transducer according to claim 3 wherein:

said fulcrum points comprise tapered points.

5. A transducer according to claim 1 wherein:

said first fulcrum means comprises a pair of conical tapered fulcrum points engaging one side of said lever and said second fulcrum means comprises a single conical-tapered fulcrum point engaging the opposite side of said lever between said pair of fulcrum points.

* * * * *